ND States Patent                                       [15]  3,637,536
Ring et al.                                                      [45]  Jan. 25, 1972

[54] HIGHLY ELASTIC POLYURETHANE FOAMS BASED ON A QUASI-PREPOLYMER OF TWO DIISOCYANATES

[72] Inventors: Hans-Georg Ring, 2844 Lemforde, Hagewederstrasse 304; Jurgen Scheffler, 2844 Quernheim, Lemforde, both of Germany

[22] Filed: May 28, 1970

[21] Appl. No.: 41,725

Related U.S. Application Data

[63] Continuation of Ser. No. 677,013, Oct. 23, 1967, abandoned.

[30] Foreign Application Priority Data

Dec. 26, 1966  Germany.............................E 33104

[52] U.S. Cl. ..............260/2.5 AT, 260/2.5 AP, 260/2.5 AZ
[51] Int. Cl. ..................................C08q 22/46, C08q 22/06
[58] Field of Search ..................260/2.5 AT, 2.5 AP, 2.5 AX

[56] References Cited

UNITED STATES PATENTS 3,336,242  8/1967  Hampson et al. .........................260/2.5
3,356,622  12/1967  Delmonte ................................260/2.5

*Primary Examiner*—Donald E. Czaja
*Assistant Examiner*—H. S. Cockeram
*Attorney*—Clelle W. Upchurch

[57] ABSTRACT

Process for the manufacture of highly elastic polyurethane foams which comprises reacting (a) a mixture comprising a polyfunctional polyether glycol having a mean molecular weight between about 3,000 and 5,500, water and catalysts with (b) a quasi-prepolymer mixture of polyether polyols enriched with at least two different organic polyisocyanates. Also included is a further process whereby the mixtures are foamed in a mold at about room temperature or slightly higher.

3 Claims, No Drawings

3,637,536

HIGHLY ELASTIC POLYURETHANE FOAMS BASED ON A QUASI-PREPOLYMER OF TWO DIISOCYANATES

This application is a continuation of Ser. No. 677,013, filed Oct. 23, 1967, now abandoned.

BACKGROUND OF THE INVENTION

1. Field of the Invention

This invention relates to a process for the manufacture of highly elastic polyurethane foams and more particularly to a process for the manufacture of polyurethane foams in a one-step process comprising the reaction of certain polyol compounds with at least two different organic polyisocyanates.

2. Description of the Prior Art

In recent years, foamed resins and particularly polyurethane foams based on polyesters and polyols have dominated the plastics field and become increasingly useful in various applications because of their ability to be molded into a wide variety of useful products. With the advent of these foamed resins and their continued wide acceptance, the emphasis has now shifted to searching for economically feasible processes by which these materials may be produced having the necessary physical characteristics suitable for a wide spectrum of areas.

These polyurethane foam products have become increasingly useful in such areas as structural supports and insulation and as materials for upholstery in the production of various types of furniture. Particularly in this area, the property of elasticity has become important so that it is extremely desirable to develop processes which will afford the production of highly elastic and flexible polyurethane foams which may be produced in a rapid one-step process without the requirement for high temperature and high pressure equipment.

Of the processes known to the prior art for the production of such foams, the most widely used has been the so-called two-step process in which a prepolymer is initially prepared which comprises the reaction product of a polyol or polyester with a polyisocyanate and thereafter reacting this prepolymer in a second step with water or another foaming agent to effect cross-linking of the polymer to produce the foams. This two-step process has obvious disadvantages particularly from the economic view and moreover has not been satisfactory because the prepolymers used are not stable for long periods of time. Therefore when the prepolymer is prepared it must be used almost immediately if polyurethane foams of good quality and good physical performance characteristics are to be obtained.

It is therefore clear that a distinct need remains in the art for an economically attractive one-step process for the production of polyurethane foams having high elasticity and flexibility.

SUMMARY OF THE INVENTION

It is accordingly one object of the present invention to provide a process for the preparation of highly elastic flexible polyurethane foams by a one-step process which overcomes or otherwise mitigates the problems now known to the prior art.

A further object of this invention is to provide a one-step process for the production of highly elastic flexible polyurethane foams suitable in a wide variety of areas which comprises the reaction of certain polyols with a quasi-polymer containing at least two different organic polyisocyanates wherein both mixtures are stable and thus storable for long periods of time.

A still further object of this invention is to provide a novel one-step process for the production of highly elastic polyurethane foams of good flexibility which involves the reaction of a polyfunctional polyether polyol mixture with a quasi-prepolymer containing at least two different organic polyisocyanates wherein foaming will occur rapidly at room temperature and thus is easily controlled.

Further objects and advantages of the present invention will become apparent as the description thereof proceeds.

In satisfaction of the foregoing objects and advantages, there is provided by this invention a process for the manufacture of highly elastic polyurethane foams having good flexibility by a one-step system which comprises reacting $a$ a mixture comprising a polyfunctional polyether polyol having a mean molecular weight between about 3,000 and 5,500, water and catalysts with $b$ a quasi-prepolymer comprising a mixture of polyether polyols enriched with at least two different organic polyisocyanates.

DESCRIPTION OF THE PREFERRED EMBODIMENTS

The process of this invention is based on the discovery that polyurethane foams, as herein described, can be produced directly by a one-step reaction system wherein a prepolymer mixture comprising polyfunctional polyether polyols having a mean molecular weight between about 3,000 and 5,500 containing in admixture therewith a small amount of water, appropriate reaction catalysts, inert flexible agents and if desired, emulsifying additives, may be reacted with a quasi-prepolymer mixture containing a polyether polyol enriched with at least two different organic polyisocyanates. It has been found according to this invention that the two primary components taking part in this reaction may be individually prepared and stored for long periods of time prior to mixing, and after the mixing is carried out, will react to form the desired polyurethane foam substantially at room temperature in a very short time. It is therefore obvious that this novel process permits production of polyurethane foams having superior physical properties by a simple and commercially attractive foaming process.

The polyfunctional polyether polyols which are considered satisfactory for use in forming component $a$ for use in the process of this invention are those polyether polyols having a mean molecular weight of between about 3,000 and 5,500, and preferably about 4,800±300, and having an hydroxyl number of preferably 35±2. These materials are preferably branched, principally trifunctional, graft polymerizates obtained by grafting ethylene oxide on polyoxypropylene adducts, which have a mean molecular weight of preferably 3,400 to 3,600. These latter materials preferably consist of propylene oxide and propanetriol reaction products or propylene oxide and trimethyol propane reaction products.

It is of course to be understood that other polyether polyol reaction materials may be employed in the process of the present invention so long as they have a mean molecular weight of between about 3,000 and 5,500 for initiation of the foaming process. These materials are well known in the prior art.

It is also mandatory to employ suitable catalysts in the foaming system which catalysts must be selected so as not to be detrimental to aging of the resulting foam. It has been found that the reaction may be carried out satisfactorily using catalysts comprising those of the aliphatic amine type such as triethylene diamine, diethylene diamine, trimethyl amine, tetramethyl-1,3-butanediamine and the like. Also organometallic catalysts may be employed including those based on lead and tin and which may be exemplified by carbon to tin or carbon to lead bonds. These catalysts include such materials as trimethyltin hydroxide, tributyltin hydroxide, trimethyltin chloride and the like. Also mixtures of the amine and organometallic catalysts may be employed if desired. All of these catalysts are well known in the polyurethane foaming art and need not be further described here.

It is also necessary to include in the foaming system a small amount of water to effect foaming of the reaction and this is achieved by adding the required amount of water to the polyether polyol mix. In addition, it is also within the scope of the invention to add to the polyol reaction mixture additional small amounts of various compounds which enhance the properties of the final product and aid in the ease of reaction. In this regard it is to be understood that various inert flexible agents, emulsifying additives such as those of the silicone type, fillers, coloring agents and the like may be added.

It is also contemplated that various inert blowing agents may be added to the reaction mixture such as those based on the fluorocarbons including monofluorotrichloromethane and the like. These foaming agents are also well known in the polyurethane formulation art.

The above identified reactive materials for preparation of polyol component a are employed in the following preferred amounts based on parts by weight:

| Reactant | Amount |
| --- | --- |
| Polyether Polyol | 75 to 90 |
| Water | 1 to 10 |
| Inert blowing agents | 1 to 20 |
| Catalysts | 0.1 to 5 |
| Fillers, colorants, etc. | 0.1 to 5 |

An especially preferred formulation is where the ratio of water to inert blowing agents is about 1 to 2:5.

The above materials are merely mixed and then stored until ready for use, there being no reaction therebetween until mixed with component (b) described hereinafter.

After the above identified polyol mixture is prepared, it is reacted under foaming conditions of this invention with a component b which comprises a quasi-polymer mixture containing at least two different kinds of organic polyisocyanates in combination with certain polyethers as described hereinafter. The second component preferably comprises a mixture which is referred to herein as a "quasi-prepolymer" and contains preferably certain mixtures of aromatic diisocyanates with, or which have been built up with, a polyether having a mean molecular weight of about 4,000±300 and a hydroxyl number of about 42±3. Preferred polyethers for use in formation of component b comprise preferably the reaction products of alkylene oxides such as propylene oxide with a polyol compound such as trimethylol propane, although equivalent materials may be used. These polyethers per se are also well known in the art. It has also been found desirable to add a small amount of a further polyether alcohol of lower molecular weight, such as about 300 and a hydroxyl number of about 500 to 600.

The polyisocyanates to be included in the formation of component b includes at least two differing polyisocyanates, preferably the isomers of different—NCO content such as the toluene diisocyanates, although equivalent materials may be employed. Of the various toluene diisocyanates which may be used, there may be mentioned toluene diisocyanate having an isomeric content of about 65±2 percent toluene-2,4-diisocyanate and about 35±2 percent toluene-2,6-diisocyanate, a technical polyisocyanate mix containing about 91 to 94 percent diphenylmethane-4,4'-diisocyanate and—NCO parts of 30 to 32 percent, and toluene diisocyanate having an isomeric content of about 80±2 percent toluene-2,4-diisocyanate and 20±2 percent toluene-2,6-diisocyanate. A particularly preferred formulation for component (b) of this invention includes a mixture of all the above ingredients. However, it is to be understood that the process of the invention is attained so long as two different toluene diisocyanates are included.

In an especially preferred procedure for forming component (b), a prepolymer mixture comprising the polyether, polyether alcohol and toluene diisocyanate containing an isomeric content of 65±2 percent toluene-2,4-diisocyanate and 35±2 percent toluene-2,6-diisocyanate are mixed in a ratio of about 5:1:6, respectively, and this mixture is then mixed with about 1 part of the technical 91–94 percent diphenylmethane-4,4'-diisocyanate and 0.5 parts of the toluene diisocyanate containing an isomeric content of 80±2 percent toluene-2,4-diisocyanate and 20±2 percent toluene-2,6-diisocyanate.

In preparing the mixture of component b it is especially preferred to maintain a ratio between the two ether reactants of about 5.25 to 1. Also it is preferred that the proportion of the two ethers together with the toluene diisocyanate (containing 65±2 percent toluene-2,4-diisocyanate and 35±2 percent toluene-2,6-diisocyanate) be on the order of about one to one.

After component b is prepared by mixing the above ingredients, it, as well as component a, may be stored for as long as necessary before use, up to 3 months, as such long storage has no adverse effect on the ultimate foaming reaction.

When it is desired to carry out the foaming reaction, it is preferred to react component a and b in a stoichiometric proportion of about 2:1 as advantageous results are obtained thereby. However, this mixing ratio can be varied to as high as e.g., 2.5:1 or 3:1. In this case, the reaction will be "under cross-linked" which means that the deflection hardness of the finished foam will vary thus making it possible to manufacture combined materials with different deflection hardness by simply varying the a and b mix ratio.

In carrying out the foaming reaction of this invention, components a and b are merely mixed in the desired ratio (preferably 2:1) and when the mixture begins to foam, is run into a mold which is slightly preheated or kept at room temperature. After running the mixture into the mold, the latter is closed and foaming allowed to continue until complete. Foaming is usually complete in a few minutes, generally within 10 minutes or less. After the reaction is complete the polyurethane foam is recovered from the mold.

It has been found that one of the primary advantages of the process of this invention is that the components (a) and (b) when mixed will foam at room temperature, and thus foaming may be carried out without the application of external heat, thereby precluding use of expensive equipment. Moreover, high pressures are not necessary, thus adding to the commercial attractiveness of the process. Therefore, it is to be appreciated that the process of this invention is an extremely easy and economically attractive process for the production of polyurethane foams for this reason as well as the fact that storable ingredient mixtures are used and highly elastic and flexible foams are produced.

The flexible polyurethane foams made according to this process are characterized by foam skin which is exceptionally flexible for polyurethane foams made at room temperature and, due to an excellent combination of a number of properties, its density, rebound elasticity compression load hysteresis, etc., have a flexible, elastic feel which so far has not been achieved in known polyurethane technology.

The foams produced by the process of this invention have the following physical properties:

TABLE I

| Property | Dimension | Value |
| --- | --- | --- |
| Density | g./dm.$^3$ | 35.0 |
| Elongation at Break | % | 150.0 |
| Tear resistance | kp./cm.$^2$ | 1.0 |
| Compression Set: | | |
| 72 hours at room temperature | % | 4.3;4.3 |
| 22 hours at 70° C. | % | 7.4 |
| Deflection Hardness: | p./cm.$^2$ | |
| 20% | | 16.0 |
| 40% | | 20.0 |
| 60% | | 44.0 |

The following examples will serve to further illustrate the practice of the invention and are not to be considered as limitative thereon. In the examples the parts of the components employed are given as parts by weight based on the total content of the formulation unless otherwise specified.

EXAMPLE I

A quasi-prepolymer component b was prepared by mixing the following components in the proportions specified:
1. 5.25 parts of a polyether made by reaction of trimethylolpropane and propylene oxide having a mean molecular weight of 4,000±300 and a hydroxyl number of 42±3;

1.0 part of a polyether alcohol of a molecular weight of 300 and a hydroxyl number of 560; and 6.25 parts of toluenediisocyanate having an isomeric content of 65±2% toluene-2,4-diisocyanate and 35±2% toluene-2,6-diisocyanate.

12.50

After the above mixture was prepared, it was further mixed with additional diisocyanates in the following amounts:

2. 12.5 parts of prepolymer mixture (1) prepared above;

12.5 parts of a technical polyisocyanate mix with a 91 to 94 percent diphenylmethane-4,4'-diisocyanate content and a NCO parts of 30 to 32 percent; and 6.25 parts of toluene diisocyanate having an isomeric content of 80±2 percent toluene-2,4-diisocyanate and 20±2 percent toluene-2,6-diisocyanate.

After the above mixture was prepared, it was designated as consisting of 1 part of component $b$ for reaction with component (a) as described in the following examples.

EXAMPLE II

Two parts of reaction component $a$ was prepared by mixing the following: 85 parts of a trifunctional graft polymerizate having a mean molecular weight of 4,800 and an hydroxyl number of 35 which was obtained by grafting ethylene oxide on an adduct prepared from polyoxypropylene and propanetriol having a molecular weight of 3,500; 2.5 parts water, 10 parts monofluorotrichloromethane, 0.5 parts triethylenediamine and 2 parts of a coloring agent. This mixture comprises 2 parts of component (a).

After preparation of the 2 parts of this reaction mixture, it was placed in a regular two-stream foaming machine at room temperature with 1 part of the reaction component $b$ prepared as in example I. The mixture began to foam at room temperature and was immediately run into a mold at room temperature. Foaming was complete and the product was released from the mold after less than 10 minutes to yield a highly elastic foam product of good quality. The physical performance characteristics of this product are set forth above in table I.

EXAMPLE III

A reaction component (a) was prepared as in example I except that instead of a polyoxypropylene-propanetriol adduct, an adduct of polyoxypropylene and trimethylolpropane was employed. After reaction with component $b$, prepared as in example I, and removal of the material from the mold, an excellent highly elastic foam was obtained.

EXAMPLE IV

The following reactant components $a$ and $b$ were prepared as in example I using the indicated materials.

Component (a)

| | |
|---|---|
| 86.5 parts | of an activated polyether polyol based on polyoxypropylene with amines |
| 2.5 parts | water |
| 0.5 parts | triethylendiamine |
| 10.0 parts | trichlorfluormethane (Freon 11) |

Component (b)

| | |
|---|---|
| 40.0 parts | prepolymer, formed from: |
| (1) 42.0 parts | polyether polyol based on trimethylolpropane, Molecular Weight 4000, Hydroxyl Number 42 |
| (2) 8.0 parts | polyether polyol based on polyoxypropylene, Hydroxyl Number 560, |
| (3) 50.0 parts | toluylendiisocyanate 65/35, (65% 2,4-isomer and 35% 2,6-isomer) |

To prepolymer (b) there was then added.

| | |
|---|---|
| 40.0 parts | of a crude 4,4-diphenylmethanediisocyanate |

After this addition there was added.

| | |
|---|---|
| 20.0 parts | of a toluylendiisocyanate (80% 2,4-isomer and 20% 2,6-isomer). |

Mixing ratio: (a):(b)=2:1
Pot life time 15 seconds
Blowing time 140 seconds
Curing time 180 seconds An excellent foam was produced.

The preceding examples illustrate the process of the invention. The variations thereon which are obvious to those skilled in the art can be made in accordance with the teaching of the instant specification without departing form the spirit and scope of the application. Accordingly the invention is to be considered as limited only by the scope of the appended claims.

We claim:

1. A flexible polyurethane foam prepared by mixing and reacting in substantially equal parts and at room temperature
   a. a storage stable mixture comprising from about 75 to about 90 parts of a polyol having a molecular weight of from about 3,000 to about 5,500 which has been prepared by grafting ethylene oxide on a polyoxypropylene polyol having a molecular weight of from about 2,300 to about 3,600; from about 1 to about 10 parts water and from about 1 to about 10 parts of a halohydrocarbon blowing agent; and a catalyst which promotes reaction between the polyol and an organic polyisocyanate; and
   b. a mixture of (1) about 2 parts of a prepolymer prepared by reacting a polyoxyalkylene polyol having a molecular weight of from about 3,700 to about 4,000 with a tolylene diisocyanate; (2) about 2 parts of a mixture of diphenylmethane-4,4'-diisocyanate and its polymers containing about 94 percent diphenylmethane-4,4'-diisocyanate and (3) about 1 part 80 percent 2,4- and 20 percent 2,6-isomeric mixture of tolylene diisocyanate.

2. The foam of claim 1 wherein the prepolymer of $b$ is prepared by reacting a polyoxyalkylene polyol having a molecular weight of from about 3,700 to about 4,000 and a polyether alcohol having a molecular weight of about 300 in a ratio of about 5.25 to 1 with a tolylene diisocyanate.

3. The foam of claim 1 wherein the tolylene diisocyanate used to make the prepolymer is about 65 percent 2,4- and 35 percent 2,6-tolylene diisocyanate.

* * * * *